United States Patent Office 2,789,885
Patented Apr. 23, 1957

2,789,885

PROCESS FOR PRODUCTION OF SODIUM PEROXIDE

Thomas J. Tadler, Jr., Florence, Ala., and Robert H. Coleman, Ashtabula, Ohio, assignors to National Distillers Products Corporation, New York, N. Y., a corporation of Virginia No Drawing. Application November 18, 1953, Serial No. 393,004

8 Claims. (Cl. 23—184)

This invention relates broadly to an outstanding improvement in manufacturing processes for making sodium peroxide from sodium. More specifically, it relates to an outstanding improvement in a process for converting elemental sodium to sodium peroxide which includes the steps of (1) mixing elemental sodium and sodium peroxide in an inert atmosphere at a temperature above the melting point of sodium and below the temperature at which any substantial reaction occurs between sodium and sodium peroxide, (2) subjecting the sodium-sodium peroxide mixture to a temperature at which the sodium reacts with the sodium peroxide to form sodium monoxide in an atmosphere containing critical and controlled amounts of moisture and (3) converting the sodium monoxide-sodium peroxide mixture to sodium peroxide in an oxidizing atmosphere.

In the past, processes have been described for producing sodium peroxide from sodium. For example, one such process mixed sodium monoxide with elemental sodium and subsequently oxidized the supported sodium to sodium monoxide by means of air or oxygen-nitrogen mixtures. In a further operation, at a higher temperature, oxygen or air enriched in oxygen is contacted with the sodium monoxide to oxidize it to sodium peroxide. The overall rate of oxidation is quite slow, a relatively prolonged period of contact time being necessary before the conversion to sodium peroxide is complete.

Other processes have attempted to carry out the conversion to the peroxide by utilizing the fluidized solids technique. Thus, sodium peroxide is fluidized in an oxygen-containing gas at the desired reaction temperature and molten sodium is added to the fluidized solid mass. This technique has never been commercially exploited since there are many difficulties involved in simultaneously distributing molten sodium upon solid particles of sodium peroxide in an oxygen-carrying atmosphere at a temperature that induces a rapid and immediate oxidation of the sodium.

These prior art processes such as are outlined above also have other disadvantages, for instance, the production of a large amount of fines or dust, formation of a sticky reaction mass resulting in large lumps which are difficult to handle and slow to oxidize, and contamination of the product with impurities, particularly iron under the reaction conditions which give a sticky lumpy product.

One of the major objections to all the processes heretofore known is the very slow rate of oxidation achieved in formation of the peroxide from the monoxide. Variations such as the use of higher oxygen concentrations and/or higher reaction temperatures may increase this rate but these improvements also increase the cost of operation as well as give additional difficulties.

One of the objects of this invention is to provide a practical, commercial process for continuous manufacture of sodium peroxide and/or sodium monoxide.

Another object is to reduce the total overall reaction time by an improvement which makes possible a remarkable increase in the rate of oxidation of sodium monoxide to sodium peroxide.

Another object of the invention is to provide a method for manufacture of sodium peroxide wherein there is a substantial decrease in the amount of dust and fines in the product.

A further object is the elimination of sticky and lumpy reaction mixtures and the resultant extraneous contamination of the sodium peroxide product with iron and the like.

The above objects as well as others which will be further apparent from the following detailed description, may be conveniently achieved by this newly discovered improvement in the operation.

There is first formed a suitable mixture of elemental sodium and sodium peroxide by agitating a mixture of these materials in an inert atmosphere and at a temperature between the melting point of sodium and the temperature at which there is no substantial reaction between sodium and sodium peroxide. This sodium-sodium monoxide mixture is then heated to a temperature at which the ingredients react to cause the formation of sodium monoxide in the presence of controlled amounts of water vapor. The resulting sodium monoxide-sodium peroxide mixture is further heated in the presence of an oxygen-containing gas to convert the monoxide to the peroxide.

Thus, the addition of the controlled and critical amounts of water vapor to the reaction mixture during the reduction of the sodium peroxide by elemental sodium, that is, in the so-called reduction stage, results in unexpected advantages and yields superior quality product. The addition of even the relatively small amounts of water vapor to the reduction stage of this process is a radical departure from all previous practice. All prior information has emphasized that moisture should be eliminated as nearly as possible from all phases of any operation whereby elemental sodium is oxidized to sodium peroxide. The superior results obtained thereby are completely unexpected and contra to the teachings and disclosures of the prior art. Although it is not intended to limit this invention to any particular theory, it is believed that the addition of controlled amounts of moisture reduces the absolute density of the particles. Because of this effect, the action of the oxygen in the oxidation step is greatly improved.

Initially, a mass of finely divided sodium peroxide is provided, and is preferably maintained in a state of continuous movement and/or agitation. The temperature is adjusted within the range of about 100° to 205° C., and preferably from 100° to 175° C. In any case, the temperature should be above the melting point of sodium but below the temperature at which there is substantial reaction between sodium and sodium peroxide. An atmosphere which is substantially free from oxygen and inert with respect to sodium and sodium peroxide is maintained. There is added to the sodium peroxide a minor portion of elemental sodium. About 1 to 10 wt. percent based on the peroxide can be used and preferably 3 to 8 wt. percent is used. Under these conditions, the sodium does not react with the peroxide nor does it react otherwise but rather it is coated on the outside of the peroxide particles. Such mixtures can be agitated and transported by usual, well-known mechanical means.

The reduction stage of the process is then carried out. This stage of the process may be done in a separate vessel or it may be done in the same vessel as that in which the mixing took place. For instance, both the mixing and reduction stages may be carried out in the same apparatus in which there is maintained a temperature gradient with the temperature increasing in the reduction portion. The sodium-sodium peroxide mixture is elevated to a temperature at which elemental sodium reacts with the sodium peroxide to reduce an equivalent amount of the latter to monoxide. The temperature is maintained within the range between 205° and 425° C. preferably between 260° and 400° C. This reduction stage is conducted in the presence of an amount of water vapor equivalent to from about 0.03 to about 1.3 wt. percent based on the sodium and preferably from about 0.058 to 0.82 wt. percent. The solid reactant material should be thoroughly agitated in order to expose the sodium-sodium peroxide mixture as uniformly as possible to the water vapor. The required amount of water vapor may be satisfactorily introduced into the system by means of a controlled stream of moist air, nitrogen, or other suitable gas, having a definite dew point for purposes of critical control.

Under the conditions above described, there is a rapid and complete reaction of the sodium with sodium peroxide to form the equivalent amount of sodium monoxide.

The above two steps may be carried out continuously by continuous or intermittent addition of sodium and sodium peroxide to a mass of sodium coated sodium peroxide in a state of motion or agitation and by continuous removal from the resulting mass of a sodium-sodium peroxide mixture which is continuously introduced into a second mass of sodium and sodium peroxide undergoing conversion to sodium monoxide and which is held at a temperature and in an atmosphere having the proper water vapor content at which the sodium and sodium peroxide readily react to form sodium monoxide.

These two steps or stages can be employed as initial steps in the manufacture of high quality sodium peroxide. They may also be used to produce sodium monoxide if the process started with a mass of sodium monoxide.

In the third stage, called the oxidation stage, the sodium monoxide formed in the second stage on the particles of peroxide is converted to an equivalent amount of sodium peroxide. The reacting material is maintained within the temperature range between 260° and 450° C. preferably from about 315° to 400° C. Within the selected temperature range, the mass is continuously contacted with a dry, oxygen-containing gas, which may be either dry air, oxygen enriched air, or relatively pure oxygen. Either atmospheric or super-atmospheric pressures can be employed. The solids should be thoroughly agitated to insure good contact with the oxidizing gas, which is preferably used in excess to insure complete oxidation. The sodium peroxide discharged from the oxidizer is screened and that portion having the desired particle size withdrawn as commercial product, while the remainder is recirculated to the mixing step.

The water vapor may be introduced into the second stage by means of humidified nitrogen or air. Since oxygen may be present in the reduction stage without adversely affecting the process or the product, the desired amount of water vapor can be introduced conveniently by means of variable amounts of air as the carrying gas. For example, quite satisfactory results are obtained by the addition to the reduction stage of 20 cubic feet per minute of humidified air when elemental sodium is being fed at the rate of 125 to 250 pounds per hour. More or less carrying gas can be used, the prime requirement being that the amount of moisture carrying gas be sufficient to insure good contact of the water vapor with the solids.

An equivalent amount of moisture cannot, for example, be introduced as liquid water since it would be impossible to effect a uniform distribution of the water. This is true because of the fact that the liquid water reacts very rapidly with the sodium-sodium peroxide mixture and only a small portion of the reaction mass would be exposed to the water if the water were in liquid phase.

Unduly large additions of moisture are detrimental since a substantial proportion of the added water is converted to sodium hydroxide. Thus, if there is too much moisture present during the interaction of sodium with sodium peroxide to form sodium monoxide, then there is an undesirably high concentration of sodium hydroxide in the product. Too much moisture will also produce difficulties in the oxidizing step.

If too little water is used, then the outstanding yield and product quality advantages obtained by practicing the invention are lost. Thus, the rate of oxidation of sodium monoxide to sodium peroxide in the oxidizer is markedly decreased, the amount of sodium peroxide "fines" or dust particles is much higher, and the reaction time is unduly prolonged.

The following tabulated data is presented to give a general indication of satisfactory rates of water addition:

| lbs. elemental sodium fed per hour | dew point of air added to reducer, °F. | lbs. water per hr. fed to reactor | lbs. water fed per lb. of sodium |
|---|---|---|---|
| 125 | 0 | 0.0720 | 0.00058 |
| 175 | +40 | 0.475 | 0.0028 |
| 250 | +80 | 2.04 | 0.0082 |

To summarize, the introduction of limited amounts of moisture into the process for acceleration of the conversion of sodium monoxide to sodium peroxide accomplishes the following advantages and unexpected results in the manufacture of sodium peroxide:

1. A satisfactory continuous process for the manufacture of sodium peroxide is provided.
2. The total necessary reaction time to produce commercial grade sodium peroxide is greatly reduced.
3. A lower temperature for the oxidation to sodium peroxide can be employed for a given retention time.
4. The necessity for the use of expensive, relatively pure oxygen to obtain commercial grade sodium peroxide has been entirely eliminated. Thus, air can be employed as the sole oxidizing medium.
5. The product quality and yield has greatly increased due to the marked reduction in dust and fines material produced. Sticky mixtures and lumps can be entirely eliminated.
6. A drastic reduction in the percentage of impurities, particularly iron which is especially undesirable, in the product has been obtained by the elimination of high reaction temperatures in the oxidation step.
7. Losses of sodium peroxide from the system are reduced as a result of this improvement. This result is directly due to the marked reduction in dust formation.
8. Plant operation costs can be cut, including reduced cost of apparatus maintenance and decreased costs of overall production.
9. There is a greater smoothness and ease of operation.

The process will be illustrated in greater detail by the following examples, although it is not intended to limit the invention specifically thereto.

EXAMPLE 1

The data shown in Table I below were obtained during continuous runs made while operating the process of the invention. Sodium was admixed with sodium peroxide and subjected to the elevated temperature necessary for reaction of sodium with some of the sodium peroxide to sodium monoxide. The sodium monoxide was then oxidized to sodium peroxide.

The sodium peroxide product was obtained in very high yield (above 97%) and had very low iron contamination. The dew points shown for the moist air introduced into the reducer step correspond generally to from about 0.10 to about 0.60 wt. percent water based on the amount of elemental sodium.

Table I

|  | Run A | Run B |
|---|---|---|
| Feed Rates: | | |
| Sodium, #/hr. (av.) | 125 | 250 |
| Sodium peroxide, #/hr. (av.) | 2,400 | 4,450 |
| Moist air to reducer (step 2): | | |
| Flow rate, C. F. M. | 21.8-22.4 | 22.0 |
| Dew Point, ° F. | +6 to +13 | +49 to +64 |
| Product Analysis: | | |
| Na₂O₂, percent by wt | 97.1-97.3 | 97.3-97.4 |
| Fe₂O₃, p. p. m. | 96-104 | 79-81 |
| Temperatures, ° C.: | | |
| Mixer (step 1)— | | |
| inlet | 99-107 | 102-116 |
| discharge | 116-124 | 124-141 |
| Reducer (step 2)— | | |
| inlet | 210-238 | 171-196 |
| center | 224-266 | 188-218 |
| discharge | 352-382 | 404-441 |
| Oxidizer (step 3) | 346-363 | 399-429 |

EXAMPLE 2

The effect of added moisture on the completeness of oxidation is illustrated by this example. In this continuous run, 250 pounds per hour of metallic sodium were fed to the mixer. The sodium:sodium peroxide ratio in the feed was 0.073:1.0. Twenty cubic feet per minute of air having a dew point of +70° F. was introduced into the reducing zone. This corresponds to an amount of water of approximately 0.65 wt. percent based on the sodium. After having operated for a number of hours under these conditions the supply of moist air was cut off at 9:00 a. m. and it remained off until 5:15 p. m., (8¼ hours later). Samples of the product coming from the reducer and the oxidizer were taken at intervals and analyzed for Na₂O₂ and NaOH. The results given in Table II clearly show how the percentage of Na₂O₂ in the final product increases markedly with the addition of controlled amounts of water to the reduction zone. It will be noticed that the Na₂O₂ content of the product decreases sharply as soon as the moisture supply is cut off.

Table II

| Day | Time of Sample | Reducer Analyses | | | Time of Sample | Product Analyses | | |
|---|---|---|---|---|---|---|---|---|
| | | Sample No. | Percent Na₂O₂ | Percent NaOH | | Sample No. | Percent Na₂O₂ | Percent NaOH |
| 1st | ¹9:00 a. m. | 1 | 80.2 | 2.00 | | | | |
| | 10:00 | 2 | 78.1 | 1.36 | 10:45 a. m. | 3 | 95.9 | 2.05 |
| | 11:00 | 4 | 78.6 | 1.46 | 11:45 | 5 | 95.3 | 1.59 |
| | 12:00 | 6 | 77.3 | 1.43 | 12:45 p. m. | 7 | 95.4 | 1.42 |
| | 1:00 p. m. | 8 | 76.3 | 1.42 | 1:45 | 9 | 94.6 | 1.95 |
| | 2:00 | 10 | 76.4 | 1.37 | 2:45 | 11 | 93.7 | 1.62 |
| | 3:00 | 12 | 75.2 | 1.27 | 3:45 | 13 | 92.9 | 1.71 |
| | 4:00 | 14 | 75.4 | 1.09 | 4:45 | 15 | 92.6 | 1.20 |
| | ²5:00 | 16 | 75.0 | 1.13 | 5:45 | 17 | 91.3 | 1.25 |
| | 6:00 | 18 | 77.7 | 1.09 | 6:45 | 19 | 92.3 | 1.13 |
| | 7:00 | 20 | 76.6 | 1.23 | 7:45 | 21 | 92.9 | 1.33 |
| | 8:00 | 22 | 74.9 | 1.73 | 8:45 | 23 | 92.2 | 1.38 |
| | 9:00 | 24 | 76.6 | 1.28 | 9:45 | 25 | 92.3 | 1.40 |
| | 10:00 | 26 | 77.0 | 1.21 | 10:45 | 27 | 92.9 | 1.33 |
| | 11:00 | 28 | 76.2 | 1.24 | 11:45 | 29 | 93.5 | 1.26 |
| | 12:00 | 30 | 78.8 | 1.88 | 12:45 a. m. | 31 | 94.1 | 1.78 |
| | 1:00 a. m. | 32 | 78.4 | 1.65 | 1:45 | 33 | 93.7 | 1.90 |
| | 2:00 | 34 | 78.9 | 2.71 | 2:45 | 35 | 93.8 | 1.65 |
| | 3:00 | 36 | 78.9 | 2.00 | 3:45 | 37 | 93.9 | 1.94 |
| | 4:00 | 38 | 78.5 | 2.18 | 4:45 | 39 | 93.5 | 2.14 |
| | 5:00 | 40 | 78.9 | 1.94 | 5:45 | 41 | 94.5 | 2.04 |
| | 6:00 | 42 | 79.1 | 1.85 | 6:45 | 43 | 95.0 | 2.50 |
| | 7:00 | 44 | 79.5 | 1.92 | 7:45 | 45 | 94.3 | 2.51 |
| | 8:00 | 46 | 79.7 | 1.91 | 8:45 | 47 | 94.8 | 2.32 |
| 2nd | 9:00 | 48 | 80.6 | 2.44 | 9:45 | 49 | 95.0 | 1.91 |
| | 10:00 | 50 | 80.5 | 2.15 | 10:45 | 51 | 95.9 | 2.04 |
| | 11:00 | 52 | 80.5 | 1.90 | 11:45 | 53 | 95.3 | 2.22 |
| | 12:00 | 54 | 79.5 | 2.05 | 12:45 p. m. | 55 | 95.3 | 2.40 |
| | 1:00 p. m. | 56 | 79.1 | 1.91 | 1:45 | 57 | 95.3 | 2.09 |
| | 2:00 | 58 | 79.4 | 2.04 | 2:45 | 59 | 94.7 | 2.06 |
| | 3:00 | 60 | 82.0 | 2.03 | 3:45 | 61 | 95.2 | 1.98 |
| | 4:00 | 62 | 81.3 | 2.16 | 4:45 | 63 | 95.8 | 1.66 |
| | | | | | 5:45 | 65 | 96.3 | 1.93 |
| 3rd | 10:00 a. m. | 64 | 84.8 | 1.79 | | 66 | 97.6 | 2.15 |

¹ Moist air off at 9:00 a. m.
² Moist air back on at 5:15 p. m.

EXAMPLE 3

This example further illustrates the beneficial effects obtained by adding moisture during the reducing stage of the process.

The feed consisted of 140 pounds of elemental sodium and 2400 pounds of sodium peroxide per hour. The average maximum temperature of the reducer was about 411° C. The process was operating under steady conditions with sufficient moist air being introduced into the reducing stage such that the final product from the oxidizing stage analyzed about 97.5% Na₂O₂. The supply of moist air was then replaced with 20 cubic feet per minute of dry air having a dew point of about −65° F. The peroxide content of the final product decreased. After about ten hours during which relatively poor quality product was obtained, the supply of dry air was increased to about 27 cubic feet per minute. The quality of product did not improve.

Table III shows the data obtained during this experiment. The peroxide quality was decidedly poorer when the moisture supply was decreased below 0.011 wt. percent based on sodium and did not improve when the supply of dry air was increased.

Table III

| Time | Percent Na₂O₂ in Product | Condition Variations |
|---|---|---|
| 10:00 a. m. | 97.5 | |
| 11:00 | | Moist air off—dry air in at 20 C. F. M. |
| 12:00 noon | 96.5 | |
| 2:00 p. m. | 96.4 | |
| 5:00 | 95.1 | |
| 7:00 | 94.0 | |
| 9:00 | 94.0 | Dry air increased to 27 C. F. M. |
| 11:00 | 93.0 | |
| 1:00 a. m. | 93.3 | |
| 3:00 | 93.1 | |
| 5:00 | 90.6 | |

EXAMPLE 4

The data of this example show that the controlled amounts of moisture necessary for obtaining high quality and yield of sodium peroxide product, may be introduced in any suitable gas stream. For instance, air or nitrogen may be employed for carrying the moisture.

A feed mixture consisting of 125–135 pounds per hour of sodium and about 2400 pounds per hour of sodium peroxide was used in this experiment. About twenty cubic feet per minute of air having a dew point of +10° F. were fed into the reducing stage of the reaction. This corresponds to approximately 0.10 wt. percent water based on the sodium. Over a period of 30 hours, the $Na_2O_2$ content of the final product increased from 91.0 to 95.7 wt. percent.

The moist air was then replaced by 20 cubic feet per minute of moist nitrogen having a dew point of +10° F. The $Na_2O_2$ content of the product remained substantially unchanged at the relatively high value of 95.0 to 95.5% over the next 24 hour period of operation.

EXAMPLE 5

This example demonstrates that the low purity product obtained in the absence of controlled moisture addition in the reduction stage is due to incomplete oxidation and not to the presence of unoxidizable impurities.

The feed rates in this run were 125 pounds sodium and 2400 pounds of sodium peroxide per hour. Air having a dew point of about −65° F. (dry air) was introduced into the reducing stage at the rate of 20 C. F. M. After 24 hours of operation a sample of the final product was analyzed and found to contain 94.5% $Na_2O_2$. A portion of this material was further heated with pure oxygen after which the $Na_2O_2$ content increased to 97.1% by weight as a result of further oxidation.

EXAMPLE 6

This test shows how the proportion of dust and fines in the final product decrease when controlled amounts of water vapor are added to the reduction stage of the process.

In comparative runs having the same feed rates, the dew point of the introduced air (20 C. F. M.) was reduced from +30° F. to 0° F. in three steps over a period of 12 days. The average percents of fines for the three steps were as follows:

| | Percent |
|---|---|
| 30° F. dew point | 3 |
| 20° F. dew point | 9 |
| 0° F. dew point | 17 |

EXAMPLE 7

In this run, the feed to the mixing step consisted of 125 pounds of elemental sodium and 2400 pounds of sodium peroxide per hour. Approximately 20 C. F. M. of dry air having a dew point of about −65° F. were introduced into the reducing stage. After a 24 hour operation period, the $Na_2O_2$ content of the product obtained from the oxidizing stage was 94.5%.

At this time, the dew point of the air passing into the reducing stage was raised to 0° F. This corresponds to an amount of water equivalent to 0.00058 pound per pound of sodium (0.058 wt. percent). After 24 hours of operation under these conditions, the final product contained about 97.0% of $Na_2O_2$.

EXAMPLE 8

In this example the feed to the mixing step consisted of 250 pounds per hour of elemental sodium and 4,450 pounds per hour of sodium peroxide. Approximately 20 C. F. M. of moist air at a dew point of 80° F. corresponding to 0.82 wt. percent on an elemental sodium basis were introduced into the reduction stage. The product analysis consistently averaged 97.0% or better sodium peroxide over a period of several days.

What is claimed is:

1. In a process for production of sodium peroxide by (1) contacting finely divided sodium peroxide with sodium in an atmosphere substantially inert with respect to sodium and sodium peroxide at a temperature above the melting point of sodium but below the temperature at which sodium reacts substantially with sodium peroxide, (2) heating the resulting mixture to a temperature at which the sodium reacts with sodium peroxide to form sodium monoxide, and (3) contacting the resulting mixture containing sodium monoxide with an oxidizing atmosphere to form particles consisting essentially of sodium peroxide, the improvement which comprises adding to step (2) water vapor in an amount of from 0.03 to about 1.3 weight percent based on the amount of sodium.

2. A process, as defined in claim 1, wherein water vapor is added to step (2) in an amount of from 0.058 to 0.82 weight percent based on the amount of sodium.

3. In a process for producing particles consisting essentially of sodium peroxide by (1) contacting finely divided sodium peroxide particles undergoing agitation with from about 1 to about 10 weight percent of sodium based on the sodium peroxide in an atmosphere substantially inert with respect to sodium and sodium peroxide at a temperature above the melting point of sodium and below about 205° C. to form a thin layer of sodium upon the finely divided sodium peroxide particles, (2) heating the resulting sodium coated sodium peroxide particles to a temperature of from about 205 to about 425° C. to convert said sodium to a layer of sodium monoxide and (3) subjecting said sodium monoxide-containing particles to contact with an oxidizing atmosphere at a temperature of from about 260 to 450° C. to oxidize the sodium monoxide to sodium peroxide, the improvement which comprises adding to step (2) water vapor in an amount of from 0.03 to about 1.3 weight percent based on the amount of sodium, said water vapor being added as a humidified gas from the group consisting of air and nitrogen.

4. A process, as defined in claim 3, wherein the humidified gas is air.

5. In a process for production of sodium monoxide by (1) contacting finely divided sodium peroxide with sodium in an atmosphere substantially inert with respect to sodium and sodium peroxide at a temperature above the melting point of sodium but below the temperature of reaction between the sodium and sodium peroxide and (2) heating the resulting mixture to a temperature at which sodium reacts with sodium peroxide to form sodium monoxide, the improvement which comprises adding to step (2) water vapor in an amount of from 0.03 to about 1.3 weight percent based on the amount of sodium.

6. A process, as defined in claim 5, wherein water vapor is added to step (2) in an amount of from 0.058 to 0.82 weight percent based on the amount of sodium.

7. In a process for producing sodium monoxide by (1) contacting finely divided sodium peroxide particles undergoing agitation with from about 1 to about 10 weight percent of sodium based on the sodium peroxide in an atmosphere substantially inert with respect to sodium and sodium peroxide at a temperature above the melting point of sodium and below about 205° C. to form a thin layer of sodium upon the finely divided sodium peroxide particles and (2) heating the resulting sodium coated sodium peroxide particles to a temperature of from about 205 to about 425° C. to convert said sodium to a layer of sodium monoxide, the improvement which comprises adding to step (2) water vapor in an amount of from 0.03 to about 1.3 weight percent based on the amount of sodium, said water vapor being added as a humidified gas from the group consisting of air and nitrogen.

8. A process, as defined in claim 7, wherein the humidified gas is air.

(References on following page)

References Cited in the file of this patent

UNITED STATES PATENTS 2,685,500   Hulse et al. _____ Aug. 3, 1954

FOREIGN PATENTS 549,299   Great Britain _____ Nov. 16, 1942

OTHER REFERENCES

McPherson and Henderson's "General Chem." 3rd ed., page 164, Ginn and Company, N. Y.